United States Patent [19]
Rivin

[11] Patent Number: 4,944,196
[45] Date of Patent: Jul. 31, 1990

[54] CONJUGATE GEAR SYSTEM

[75] Inventor: Eugeny I. Rivin, Lathrup Village, Mich.

[73] Assignee: The Board of Governors of Wayne State University, Detroit, Mich.

[21] Appl. No.: 321,375

[22] Filed: Mar. 10, 1989

[51] Int. Cl.$^5$ .................... F16H 55/16; F16H 55/14
[52] U.S. Cl. .................................. 74/443; 74/461; 74/462; 74/465
[58] Field of Search .............. 74/443, 460, 461, 462, 74/464, 465, 468

[56] References Cited

U.S. PATENT DOCUMENTS

| | | | |
|---|---|---|---|
| Re. 28,696 | 1/1976 | Rouverol | 74/462 |
| 612,840 | 10/1898 | Gleason | 74/460 |
| 624,734 | 5/1899 | Barr | 74/468 |
| 1,408,568 | 3/1922 | Freudenreich et al. | 74/460 |
| 3,448,631 | 6/1969 | Sullivan | 74/409 |
| 4,184,380 | 1/1980 | Rivin | 74/461 |
| 4,373,925 | 2/1983 | Fickelscher | 464/158 |
| 4,543,841 | 10/1985 | Ju | 74/461 |
| 4,665,763 | 5/1987 | James | 74/425 |

FOREIGN PATENT DOCUMENTS

| | | | |
|---|---|---|---|
| 52-6864 | 1/1977 | Japan | 74/443 |
| 53-16154 | 2/1978 | Japan | 74/462 |

*Primary Examiner*—Allan D. Herrmann
*Attorney, Agent, or Firm*—Krass & Young

[57] ABSTRACT

A conjugate gear system including a pair of meshingly engageable toothed gears, at least one member of the gear pair having at least one three-component tooth. Each three-component tooth is comprised of a central core, at least one face disposed thereon, and a means for displaceably attaching the face section to the core such that the face section is displaceable with respect to the core in the direction of the sliding component of motion created by meshing engagement of the gear pair. By separating out the sliding component in this fashion, relatively pure rolling contact is maintained between the engaged surfaces of the gear pair at all times, thus reducing sliding friction, thermal expansion, and noise levels created by the engagement of the gears.

22 Claims, 2 Drawing Sheets

CONJUGATE GEAR SYSTEM

FIELD OF THE INVENTION

This invention relates to the field of gear systems for mechanical power transmission and, more particularly, to such a system having a pair of meshingly engageable toothed gears including a three-component tooth designed to separate the sliding component of motion from the rolling component of motion produced by meshing engagement of the gear pair.

BACKGROUND OF THE INVENTION

Conventional conjugate gearing consists of rigid gears having unitary teeth rigidly formed thereon, which gears convey mechanical power by forces transmitted from the unitary teeth of one gear to the unitary teeth of a mating gear. As the gears rotate, the point of contact on any engaged tooth moves from tip to root or from root to tip of the tooth. This contact includes both a rolling component of motion and a sliding component of motion, the sliding component having a velocity which reverses direction as the point of contact crosses the meshing circle of the gear. (The meshing circle is determined by the center distance of the gears and their numbers of teeth, but does not depend on the geometry of the gears.) The sliding component produces sliding action between the teeth, resulting in friction, which in turn causes noise, wear, energy losses and thermal expansion of the gear teeth.

Due to the aforementioned thermal expansion, the tooth thickness of at least one member of a pair of mating gears must be formed slightly smaller than the space between the teeth of the opposed mating gear to accommodate said thermal expansion and prevent binding of the gear teeth. Because of this tolerance factor necessitated by thermal expansion, the gear teeth of a meshing pair engage on only one face of their tooth profiles. Also, in many instances, only one pair of teeth are engaged at any particular moment and both engaging teeth have concave profiles, thus generating highly concentrated contact (Hertzian) loading due to transmitted payload forces. Therefore, since only a fraction of the gear tooth faces are engaged and since intensive payload forces are acting on the tooth surfaces while the latter are engaged in the reciprocating sliding process, the load capacity of the gears is substantially limited. Enhancement of the load capacity is highly desirable in applications requiring transmission of high power at minimum transmission weights, such as for high performance vehicles and aerospace applications such as satellites, spacecraft and the like.

Typically, state-of-the-art toothed gears are machined from highly alloyed steel. The gears are then given special heat treatment to lend the teeth high core strength combined with great surface toughness and endurance. However, profile errors in the teeth caused by the machining process often lead to high intensity noise and increased friction between engaged faces of the mating teeth. Furthermore, lubrication is complicated by the in-cycle stoppage.

In many applications, the reduction of noise is crucial. For example, the most common means of detection of submarines is an underwater acoustic method in which sounds emitted by the various mechanical components of the vessel are detected. An important component of this emitted noise is produced by the gearing used in submarine machinery. By eliminating or greatly reducing the intensity of the sound, probability of detection by the acoustic method may be reduced.

Some attempts have been made in the prior art to reduce or minimize sliding friction between, and noise created by, the engaging faces of gear teeth. For example, U.S. Pat. No. 4,665,763 discloses a worm gear device in which the worm gear is configured as a wheel having a plurality of spheres captured in cages disposed thereabout. The worm is configured as a track which engages these spheres. In this manner, sliding contact between the worm gear and the worm is replaced by rolling contact, thus minimizing friction. However, such a worm gear system is difficult to fabricate and has not enjoyed widespread application. U.S. Pat. No. 3,448,631 discloses a gearing system in which sliding friction is eliminated by including a plurality of pressure pads on the gear teeth of the rack, each pad adapted to release a high pressure stream of hydraulic fluid to form a fluid bearing surface. Obviously, such a complicated lubrication system increases both the bulk and weight of the gear system and thus, negates the usefulness of the system in applications requiring minimum weight and bulk.

U.S. Pat. No. 4,184,380 issued to the inventor of the present invention, discloses a toothed gearing system in which a resilient coating is affixed to the engaging surfaces of the gear teeth, the coating having a thickness, shear resistance and coefficient of friction such that the sliding that would occur between uncoated teeth is taken up by shear deformation of the coating. However, pure shear deformation in the coating would materialize only in cases when curvature radii of the tooth surface are constant along the profile or segments thereof, such as is the case in conformal (Wildhaber-Novikov) or in clock gears. If the curvature radius of the profile is continuously changing, as in the most widely used involute gears, then a compression component is added to shear deformation in the coating. It increases resistance to deformation in the coating and reduces effectiveness of the method.

U.S. Pat. No. 4,543,841 discloses a gearing system in which a first gear wheel having a plurality of conventional, fixed teeth is driven by a second wheel having radially slidable teeth. In response to centrifugal force, the slidable teeth project from the periphery of the second gear wheel and engage and drive the first gear wheel. In this patent, each entire driving tooth is slidable but only in a radial direction. U.S. Pat. No. 4,373,925 discloses an elastic coupling comprised of two driving gears engaging a planet gear. This gearing system is adapted to maintain constant contact between gear teeth and, towards that end, includes radially slidable teeth. However, the teeth are not operative to eliminate sliding friction. U.S Pat. No. Re. 28,696 discloses a particular profile and shape of gear teeth designed to reduce sliding friction. This invention finds particular applicability to gears molded from dry bearing materials. It would be difficult to adapt to heavy duty gears which are cut rather than molded.

In short, none of the prior art patents discussed above serve to eliminate or minimize the sliding component of motion, as well as attendant friction and noise problems, in a completely satisfactory manner. The gearing systems disclosed in these references are either prohibitively expensive to produce, not suitable to heavy-duty applications, or not particularly effective in reducing sliding friction.

It will thus be appreciated that there remains an unfulfilled and long felt need for a tooth gear system of relatively simple design which may be employed to reduce or minimize sliding friction and attendant noise generated during the meshing engagement of the gears. The present invention addresses the inadequacies of the prior art by providing a conjugate gear with a three component tooth which acts to separate the sliding component of motion from the rolling component of motion, therefore reducing sliding friction, thermal expansion, and attendant noise levels. The herein disclosed conjugate gear also has the advantage of reducing material costs in that an interior or core portion of the gear can be fabricated of a strong, but possibly light, material, with surface portions thereof made of a material having high hardness and good wearing characteristics. These and other advantages of the present invention will be readily apparent from the drawings, discussion and claims which follow.

SUMMARY OF THE INVENTION

The present invention provides a gear system for transmitting mechanical power designed to separate the sliding component of motion from the rolling component of motion and to minimize sliding friction. The gear system includes a pair of meshingly engageable toothed gears, the meshing engagement therebetween producing a sliding component of motion and a rolling component of motion. At least one member of the gear pair includes at least one three-component tooth, each three component tooth having a rigid core, a rigid face, and means for displaceably mounting said face on said core such that the face is displaceable with respect to the core in the direction of the sliding component of motion. As the teeth of the pair of gears mesh, the face on each meshing, three-component tooth is displaced along the direction of the sliding component of motion, thereby accommodating it. Hence, substantially only the rolling component of motion will be transferred between contacting surfaces of driving gear and driven gear, thereby minimizing sliding friction, reducing attendant noise levels, and permitting high power transfer at minimum transmission weights.

The three-component tooth of the present invention may be used to simulate many types of useful gear actions, for example, but not only, involute gear action. An involute may be described as the path traced by a point on a string as it is unwound from a circular cylinder. In order to obtain an involute gear action prior art gear teeth must be cut such that their final shape approximates the mathematical description of an involute. However, it has been found that the teeth of the gear system of the present invention can be designed to exhibit involute gear action even though the tooth profiles of the individual teeth are not truly involute. This is so because the path traveled by the face of the three component tooth of the instant invention as it mates with its corresponding gear face is dependent on several factors, including the profile of the face, the shape of the core and the amount and direction of displacement therebetween. Hence, the present gear system provides the effect of an involute tooth profile and the advantages attendant thereupon.

The face of the three-component tooth of the instant invention may take the form of a crescent disposed along one profile surface of the exposed core of the tooth. Alternately, each tooth may have a pair of such crescents disposed along the profile surface on each side of the tooth. In still another embodiment, the face may be one piece and extend along substantially both profile surfaces on each side of the tooth. The face may have a profile such as to create the above described involute gear action when disposed on a core which is of constant curvature radius.

Since the gear system of the present invention may act to reduce sliding friction, especially when elastic connections are used between the crescent and the core of the tooth, less thermal expansion is encountered during operation. Hence, the spacing between the gear teeth may be reduced, thus permitting the meshing teeth to engage on both tooth faces. In this way, greater power can be transmitted at reduced gear weight.

The rigid core may be fabricated of any number of known materials having high strength characteristics. Especially desirable materials for fabricating the core section include various steels, titanium, aluminum, fiber reinforced synthetic and metal matrix materials, and combinations thereof.

The face of the gear is fabricated from a material of high hardness such as ceramics, cermets, high hardness-surface endurance steel, other alloy steels, certain fiber reinforced metals and synthetic materials, and combinations thereof.

The means for displaceably mounting the face to the core may take a number of forms. For example, rubber laminates may be used to mount the face on the core, with shear deformation of the rubber accommodating the displacement of the face with respect to the core. Alternately, a channel may be formed in the core with the face disposed partially therein. A biasing means may also be disposed within the channel, said biasing means acting to return the face back to an initial position after it has been displaced in the direction of the sliding component of motion to the terminal position within a meshing cycle. The biasing means may comprise, for example, a spring. Bearing means may be disposed between the face and the core to even further reduce friction therebetween.

BRIEF DESCRIPTION OF THE DRAWINGS

The present invention can best be understood with reference to the following detailed description and drawing in which.

DETAILED DESCRIPTION OF THE PREFERRED EMBODIMENT

Figure 1:
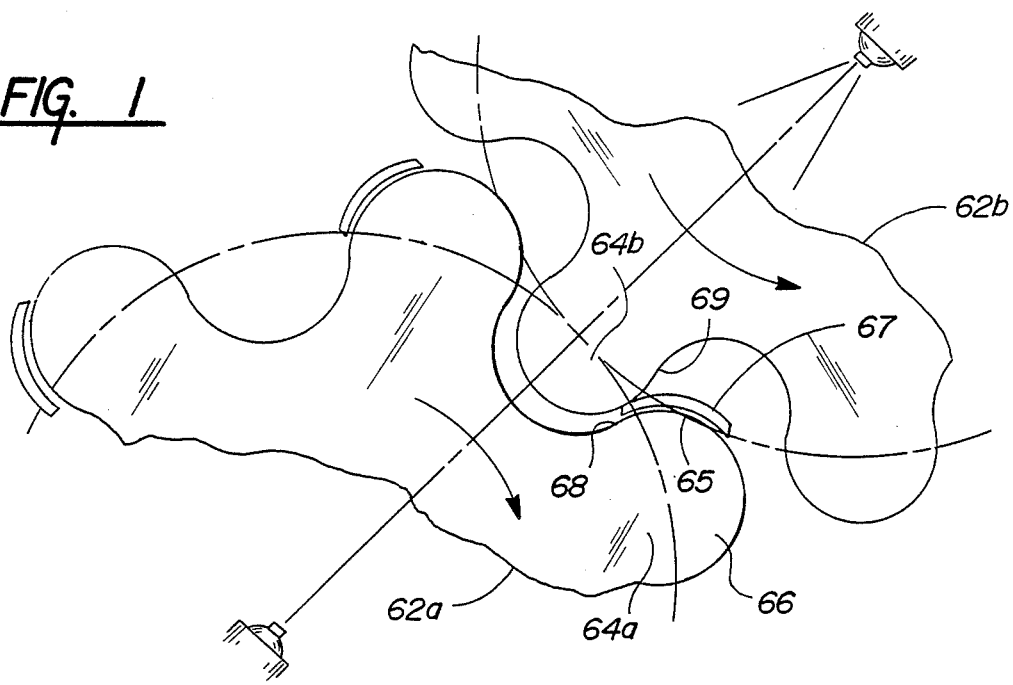
FIG. 1 is a schematic view of meshing gear teeth showing involute gear action created by gear teeth embodying the of the instant invention.

Throughout the following detailed description, like reference numerals are used to refer to the same element of the present invention shown in multiple embodiments thereof.

FIG. 1 illustrates how any conjugate profile action, for example, involute gear action is obtainable by utilizing the teachings of the instant invention even if one or both members 62a,62b of the gear pair do not have a an evaluate profile. Member 62b of gear pair 62a,62b has a one-piece, prior art solid tooth 64b of involute profile. However, gear tooth 64a of gear 62a does not have an involute profile. Rather, a face in the form of a crescent 68 is disposed on a circular contact surface 65 which has a constant curvature radius. The external surface of tooth 64a has an external profile 67, computed by a special algorithm, which is different from a profile 69 of solid tooth 64b.

In the case of the gear pair 62a,62b shown in FIG. 1, external profile 69 of tooth 64b is involute, and external profile 67 of tooth 64a is not involute. The computational algorithm is such that, if gear 62b is rotating uniformly, gear 62a should also rotate uniformly, and only rolling contact, without sliding contact occurs between external profiles 67 and 69, while pure sliding displacement occurs between contact surface 65 and crescent 68. Thus, the combination of rolling contact on external profile 67 and sliding displacement on contact surface 65 is kinematically equivalent to the rolling and sliding components of motion created if tooth 64a were solid with an involute profile. Due to this fact, the resultant motion of gear 62a as it is displaced relative to the core of tooth 64a while meshingly engaged with tooth 64b is the same as if tooth 64a were a solid tooth of involute or other conjugate profile.

Although contact surface 65 of tooth 64a is shown as circular in configuration (with a finite curvature radius), it is possible that it may have a different configuration depending on external profile 67 of crescent 68. For example, contact surface 65 might be configured to be flat (infinite curvature radius), with the external profile 67 of crescent 68 computed by algorithm to create a desired conjugate, for example involute equivalent, profile for tooth 64a as the gear meshingly engages with tooth 64b.

Figure 2:
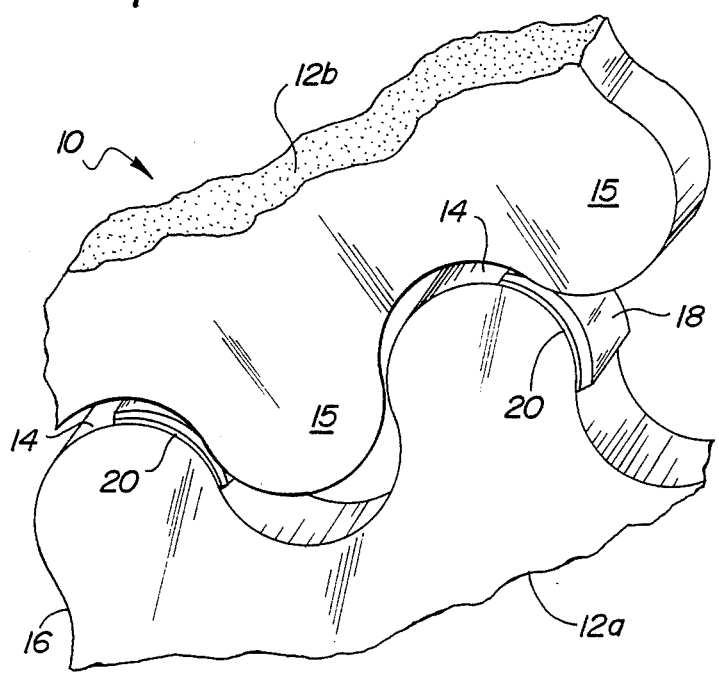
FIG. 2 is a perspective view of a portion of a conjugate gear system illustrating the principles of the herein disclosed invention.

Referring now to FIG. 2, there is shown a portion of a conjugate gear system 10 constructed in accordance with the principles of the instant invention. The conjugate gear system 10 includes first and second meshing gears 12a,12b. Formed on one member 12a of the pair of meshing gears 12a,12b are a plurality of three-component teeth 14. Each three-component tooth 14 is comprised of a rigid core 16, a crescent-shaped face 18, and means 20 for displaceably mounting the face 18 on the core 16 such that face 18 is displaceable with respect to core 16 in the direction of the sliding component of motion. In operation, the three-component tooth 14 of gear 12a engages the tooth 15 of gear 12b so as to drive that gear. Rolling contact is established between the face 18 and gear tooth 15. As the gears rotate, the face 18 is displaced with relation to the core 16 through means 20 along either a generally planar path of travel (FIG. 3) or along a portion of a generally circular path of travel with respect to the core (FIGS. 4, 5, 6), which will be described in greater detail hereinbelow. Such displacement permits pure rolling contact between the crescent face 18 and the gear tooth 15. The sliding component of the relative motion is accommodated by displacement of the face 18. While sliding friction is not eliminated, it is shifted from the point of contact of the gear teeth to the region wherein the face 18 contacts the core 16, at which location the friction may be accommodated by lubricants, bearings, etc. without the detrimental effect of concentrated contact pressures. Obviously, the three-part tooth 14 may be used as the driving tooth or the driven tooth of a gear system.

Figure 3:
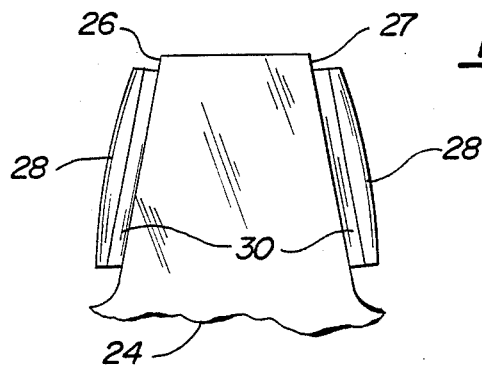
FIG. 3 is a front elevational view of an alternate embodiment of a gear tooth of the present invention.

FIGS. 2, 3, 4, and 5 show various means of attaching the face to the core. In FIG. 3, two faces 28 are mounted on core 26 by means of attachment means 30. One face 28 is disposed on each side of the core 26 of tooth 24. In this manner, the advantages of the conjugate gear system 10 of the instant invention may be obtained when the gears 12a,12b are driven in either rotational direction. In both FIGS. 2 and 3, the means of attachment 20,30 respectively comprise a rubber-like layer or rubber-metal laminate (here "metal" stands for any rigid material), and the faces 18, 28 are formed from a relatively hard material. Meshing engagement of gears 12a,12b causes shear deformation of rubber laminate 20,30 in the direction of the sliding component of motion, thus serving as a combination of bearing and bias (returning spring) for the said component of motion.

Figure 4:
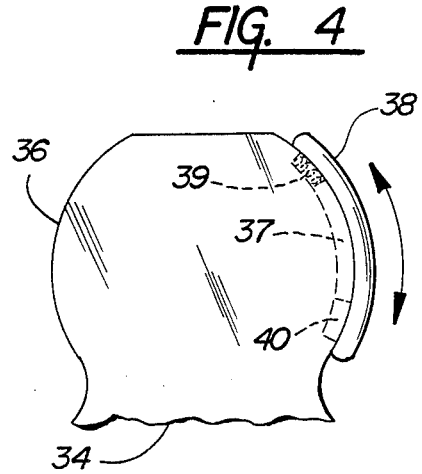
FIG. 4 is a front elevational view of another embodiment of gear tooth according to the present invention.

Another embodiment is depicted in FIG. 4. In this embodiment, the radius of curvature of core 36 is finite. In FIG. 4, the face 38 is attached to the core 36 of tooth 34 by means of channel 40 formed in core 36. A portion 37 of face 38 is adapted to engage channel 40 so that face 38 may slide back and forth with respect to the surface of core section 36 as the gears meshingly engage. In FIG. 4, spring 39, also disposed in channel 40, serves as a biasing means to return face 38 to a non-displaced position after engagement of tooth 34 with its mating tooth (not depicted) on the other member of the gear pair 12a,12b.

Figure 5:
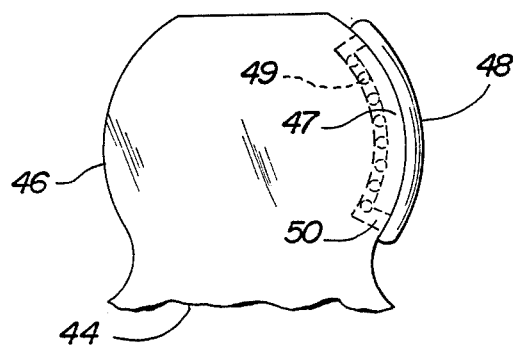
FIG. 5 is a front elevational view of yet another embodiment of a gear tooth of the present invention.

FIG. 5 depicts an embodiment similar to that shown in FIG. 4, except that bearing means 49 are disposed between portion 47 of face 48 and channel 50 formed in core 46 of tooth 44. Bearing means 49 is composed of rolling bodies (balls on rollers) and thus serves to even further reduce or eliminate sliding friction encountered when face 48 is displaced with respect to core 46.

Figure 6:
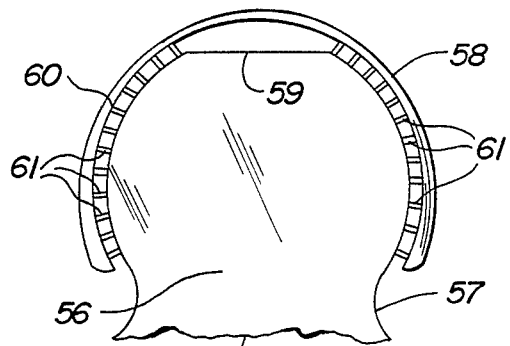
FIG. 6 is a front elevational view of a gear tooth showing a single displaceable surface disposed over both sides thereof.

In the embodiment shown in FIG. 6, both profile surfaces of core 56 of tooth 54 are covered by a unitary face 58 disposed thereon. Naturally, this requires that axes of the cylindrical surfaces on both sides of core 56 coincide and their curvature radii have the same magnitudes. Face 58 also covers tip 59 of tooth 54 to form a unitary piece. Similarly, attachment means 60 extends along both sides of tooth 54. In this case, attachment means 60 is designed as a set of springs 61 having high stiffness in the direction normal to the surface of core 56 and low stiffness in the direction of sliding motion. An example of flat springs 61 is shown in FIG. 6, while other types of springs can, obviously, be used.

Figure 9:
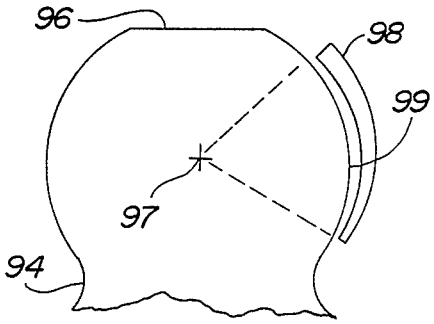
FIG. 9 is a schematic view of yet another configuration of the gear tooth of FIG. 8.
Figure 7:
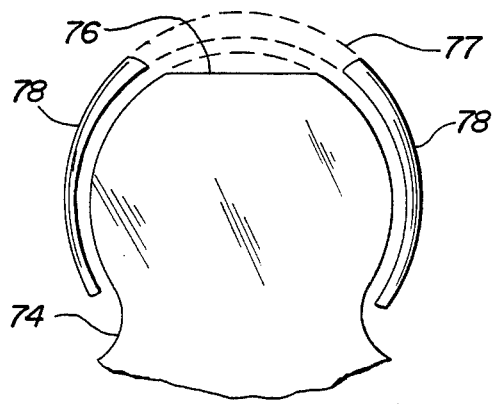
FIG. 7 is a schematic view of another configuration of a gear tooth of the instant invention.
Figure 8:
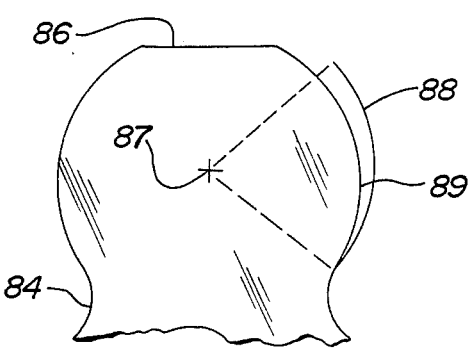
FIG. 8 is a schematic view of a gear tooth having a pivoting according to the instant invention.

FIGS. 7, 8 and 9 illustrate other various configurations of the three-component gear tooth of the instant invention. These embodiments are shown schematically to illustrate the disposition of the face in relation to the core. In FIG. 7, face 78 is shown as multiple segments of a ring 77. The centerpoint of the ring 77 is offset with respect to the centerpoint of the radius of curvature of core 76 of tooth 74. In FIG. 8, face 88 is pivotally mounted with respect to core 86 of tooth 84 about a pivoting point 87 to form a rigid pivotal connection between the face 88 and the center of curvature of the face trajectory. Such a pivotal support for the face can work in conjunction with supporting action along the core surface 89 in FIG. 8. Another embodiment shown in FIG. 9 has face 98 supported solely by pivot 97, without contact with core 99.

Figure 10:
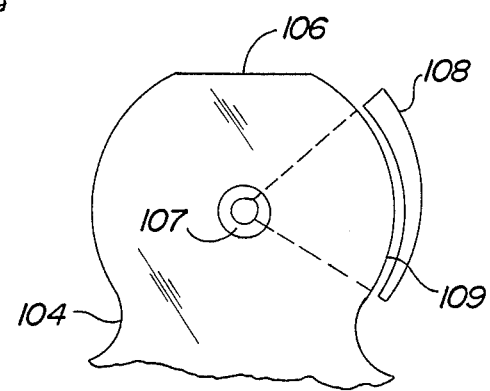
FIG. 10 is a schematic view of yet another configuration of the pivoting gear tooth of FIG. 8.

Yet another embodiment in FIG. 10 has an elastic type pivot 107 such as a rubber-like, rubber laminate, torsional spring, Bendix-like joint or the like. Such design combines guidance with bias (returning) action.

Figure 11:
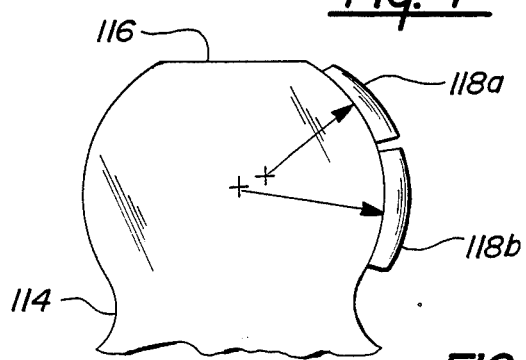
FIG. 11 is a schematic view of yet another configuration of a gear tooth of the instant invention.

FIG. 11 shows a tooth 114 with a core 116. Face 118 is mounted on core 116 and comprises two segments 118a, 118b having differing cylindrical contact surfaces with core 116.

It is readily apparent that both the core and the face of the three-component tooth disclosed herein may take a variety of configurations. Likewise, the means for displaceably attaching the face section to the core may be any of many conventionally known means. Thus, the embodiments and exemplifications shown and described herein are meant for illustrative purposes only and are not intended to limit the scope of the present invention, the true scope of which is limited solely by the claims appended hereto.

I claim:

1. A gear system for transmitting mechanical power comprising a pair of meshingly engageable, conjugate toothed gears, the engagement therebetween producing a sliding component of motion and a rolling component of motion, at least one member of said pair of gears having at least one three-component tooth, which tooth includes:
   a rigid core;
   at least one rigid crescent disposed thereon, said crescent rollingly engageable with a tooth of the other member of the gear pair; and
   means for displaceably mounting the crescent on the core such that the crescent is displaceable with respect to the core in the direction of the sliding component of motion, whereby the sliding component of motion is separated from the rolling component of motion during meshing of the gear pair.

2. The gear system of claim 1 wherein said core is comprised of a material selected from the group consisting essentially of: steel, titanium, aluminum, fiber reinforced synthetic materials, metal matrix materials, and combinations thereof.

3. The gear system of claim 1 wherein said face is comprised of a material selected from the group consisting essentially of: ceramics, high hardness-surface endurance steel, fiber reinforced synthetic materials, fiber reinforced metals and combinations thereof.

4. The gear system of claim 1 wherein said means for displaceably mounting said crescent to said core comprises a rubber laminate disposed therebetween.

5. The gear system of claim 1 wherein said means for displaceably mounting said crescent to said core comprises a set of flat springs disposed therebetween.

6. The gear system of claim 1 wherein said means for displaceably mounting said crescent to said core includes biasing means.

7. The gear system of claim 6 wherein the biasing means comprises a spring.

8. The gear system of claim 1 wherein said means for displaceably mounting said crescent to said core comprises a channel formed in said core, said crescent being partially disposed in said channel.

9. The gear system of claim 8 further comprising a spring disposed in said channel to bias said crescent into a non-displaced position with respect to said core.

10. The gear system of claim 1 wherein said crescent extends along both sides of an exposed portion of said core and is displaceable with respect to said core in directions corresponding to the sliding component of motion for both clockwise and counterclockwise rotation of the gear pair.

11. The gear system of claim wherein a conjugate gear action is simulated by a combination of an external profile of the crescent and the path of displacement of the crescent as it is displaced along a contact surface of the core.

12. The gear system of claim 1 wherein the crescent is disposed along one side of an exposed portion of the core.

13. The gear system of claim 11 wherein an approximate conjugate gear action is simulated by a combination of an external profile of the crescent and the path of its displacement along the exposed portion of the core.

14. The gear system of claim 1, wherein said means for displaceably mounting the crescent includes a bearing associated therewith.

15. The gear system of claim 1, wherein said means for displaceably mounting the crescent is configured to allow displacement of the crescent along a portion of a generally circular path of travel with respect to the core.

16. The gear system of claim 1, wherein said means for displaceably mounting the crescent is configured to allow displacement of the crescent along a generally planar path of travel.

17. The gear system of claim 1 wherein said crescent is mounted to the core for pivotal motion with respect thereto by a pivoting means.

18. The gear system of claim 17 wherein said crescent is supported solely by said pivoting means and is spaced apart from said core during the entire range of pivotal motion.

19. The gear system of claim 17 wherein the pivoting means biases the crescent with respect to the core in a direction opposite the direction of the sliding component of motion.

20. The gear system of claim 1 wherein said crescent comprises two segments having differing internal radii of curvature.

21. The gear system of claim 1 wherein said crescent comprises at least one segment of a ring having a centerpoint of its external surface offset from the centerpoint of the radius of curvature of the core.

22. A gear system for transmitting mechanical power comprising a pair of meshingly engageable, conjugate toothed gears, the engagement therebetween producing a sliding component of motion and a rolling component of motion, at least one member of said pair of conjugate gears having at least one three-component tooth, which tooth includes:
   a rigid core;
   at least one rigid crescent disposed thereon, said crescent engageable with a tooth of the other member of the conjugate gear pair, with the external profile of said crescent configured such that only substantially pure rolling contact occurs between said external profile and said other member; and
   means for displaceably mounting the crescent on the core such that the crescent is displaceable with respect to the core in the direction of the sliding component of motion.

* * * * *

UNITED STATES PATENT AND TRADEMARK OFFICE
CERTIFICATE OF CORRECTION

PATENT NO. : 4,944,196

DATED : July 31, 1990

INVENTOR(S) : Eugeny I. Rivin

It is certified that error appears in the above-identified patent and that said Letters Patent is hereby corrected as shown below:

Column 1, line 41, "concave" should be --convex--.

Column 3, line 68, "surface" should be --surfaces--.

Column 4, line 48, "embodying the of" should be --embodying the principles of--.

Column 4, line 55, "of gear" should be --of a gear--.

Column 5, line 13-14, "have a an evaluate" should be --have an involute--.

Column 6, line 42, "Figure 4" should be --Figure 3--.

IN THE CLAIMS:

Claim 3, line 49, "face" should be --crescent--.

UNITED STATES PATENT AND TRADEMARK OFFICE
CERTIFICATE OF CORRECTION

PATENT NO. : 4,944,196

DATED : July 31, 1990

INVENTOR(S) : Eugeny I Rivin

It is certified that error appears in the above-identified patent and that said Letters Patent is hereby corrected as shown below:

Claim 11, line 10, "claim wherein" should be --claim 1 wherein--.

Signed and Sealed this

Fifth Day of November, 1991

Attest:

HARRY F. MANBECK, JR.

*Attesting Officer*   *Commissioner of Patents and Trademarks*